2,792,394

PREPARATION OF SULFENYL DITHIOCARBAMATES

Chester M. Himel, Menlo Park, Calif., and Lee O. Edmonds, Bartlesville, Okla., assignors to Phillips Petroleum Company, a corporation of Delaware No Drawing. Application January 25, 1954, Serial No. 406,049

19 Claims. (Cl. 260—247.1)

This invention relates to the production of alkyl sulfenyl dithiocarbamates. In accordance with the invention, alkyl sulfenyl halides are reacted with salts of N-substituted dithiocarbamic acids.

This application is a continuation-in-part of our copending application Serial No. 180,317, filed August 18, 1950, now abandoned, which is a continuation-in-part of our copending application Serial No. 772,218, filed September 4, 1947, now abandoned.

It has been proposed heretofore to produce alkyl sulfenyl dithiocarbamates by reacting aliphatic sulfenyl thiocyanates with salts of N-substituted dithiocarbamic acid. This process requires additional steps in preparing the aliphatic sulfenyl thiocyanate initially, as by cooling thiocyanogen in dry ether and adding ethyl mercaptan dropwise with stirring. This method also requires filter steps, and complicated washing and drying stages under extremely careful controlled conditions.

It has also been proposed to produce aryl sulfenyl dithiocarbamates by reacting aromatic sulfenyl chlorides or bromides with salts of N-substituted dithiocarbamates.

Due to the well known instability of the alkyl sulfenyl chlorides, as contrasted with the relative stability of the aromatic sulfenyl chlorides, particularly in aqueous solution, it has previously been considered that the alkyl sulfenyl halides were not useful in the preparation of other sulfenyl compounds.

This invention involves the surprising discovery that notwithstanding the hydrolytic instability of alkyl sulfenyl halides, they will react readily with salts of N-substituted dithiocarbamic acid in aqueous solution to form alkyl sulfenyl dithiocarbamates in high yields. The reactant alkyl sulfenyl halide may be readily prepared in accordance with the method of copending application, Serial No. 387,386, filed October 21, 1953. The alkyl sulfenyl dithiocarbamates are useful as insecticides, bactericides, fungicides, moth proofing agents, chemical intermediates, and as vulcanization accelerators for natural or synthetic rubber.

The products made in accordance with the invention conform to the formula

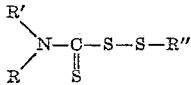

wherein

is a primary or secondary amino group in which either or both R and R' may be alkyl, cycloalkyl, aryl or aralkyl hydrocarbon radicals or radicals which together with the nitrogen atom form a 5 or 6 membered saturated heterocyclic ring, at least 4 members being carbon atoms, such as piperidyl, morpholinyl, thiamorpholinyl, 2-methyl-thiamorpholinyl, pyrrolidyl, piperazinyl, pipecolinyl, etc., or in which either R or R' may be a hydrogen atom, and R" is an alkyl group.

Specific examples of these compounds are 3-oxapentamethylene - tert - hexylsulfenyl dithiocarbamate, pentamethylene-sec-octylsulfenyl dithiocarbamate, tetramethylene-n-decylsulfenyl dithiocarbamate, 3 - azapentamethylene - isobutylsulfenyl dithiocarbamate, 2 - methylpentamethylene-isopropylsulfenyl dithiocarbamate, 3-triapentamethylene-n-amylsulfenyl dithiocarbamate, 2 - methyl - 3-thiapentamethylene-dodecylsulfenyl dithiocarbamate, N-cyclohexyl - n - octylsulfenyl dithiocarbamate, N-phenyl-sec-heptylsulfenyl dithiocarbamate, and N-benzyl-tert-nonylsulfenyl dithiocarbamate. The method of this invention produces alkyl sulfenyl dithiocarbamates in substantially quantitative yields when operating under optimum reaction conditions. In general, the sulfenyl halide having the alkyl group corresponding to the R" radical in the final product is reacted in solution with an equimolar amount of a suitable salt of an N-substituted dithiocarbamic acid. Appropriate dithiocarbamates for use in the present process correspond to the formula

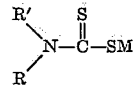

wherein

is a substituted primary or secondary amino group in which R and R' are selected from the group consisting of hydrogen (in which case either R or R' may be hydrogen, but both R and R' may not be hydrogen), alkyl, cycloalkyl, aryl and aralkyl radicals; and radicals which, together in combination with the nitrogen atom constitute a 5 or 6 membered saturated heterocyclic ring, at least 4 members being carbon atoms, such as piperidyl, morpholinyl, thiamorpholinyl, 2-methylthiamorpholinyl, pyrrolidyl, piperazinyl, pipecolinyl, etc., so that not more than one hydrogen atom is attached to the nitrogen; and M is a metal or a salt-forming radical. The members of said heterocyclic ring may, in addition to carbon, comprise oxygen, nitrogen, sulfur or the like atoms. R or R', or both, include alkyl radicals, such as methyl, ethyl, n-propyl, isopropyl, n-butyl, isobutyl, tert-butyl, amyl, hexyl, isohexyl, octyl, dodecyl; cycloalkyl radicals such as cyclohexyl and cyclopentyl; aryl radicals such as phenyl; and aralkyl radicals such as benzyl and the like. It is preferred that the salt-forming radical be a metal, such as an alkali or alkaline earth metal, for example, sodium, potassium, calcium, barium or magnesium, since other salt-forming radicals, particularly those comprising amino or ammonium groups tend to combine with the sulfenyl halide in a competing reaction which has the effect of reducing the yield of the desired final product. The invention is effective with relatively high yields, even when other salt-forming radicals of the types mentioned are used, in spite of the fact that the final yield is somewhat reduced. Any salt-forming cation or metal may be used and the invention is not predicated upon the use of any particular metal.

Specific examples of the dithiocarbamates are sodium 3 - oxapentamethylenedithiocarbamate, calcium pentamethylenedithiocarbamate, magnesium tetramethylenedithiocarbamate, barium 3 - azapentamethylenedithiocarbamate, potassium 2-methylpentamethyldithiocarbamate, lithium 3-thiapentamethylenedithiocarbamate, sodium 2-methyl-3-thiapentamethylenedithiocarbamate, sodium N-cyclohexyldithiocarbamate, sodium N-phenyldithiocarbamate, and sodium N-benzyldithiocarbamate.

The alkyl sulfenyl halides which are suitable for carrying out the process of this invention include chlorides, bromides and iodides and may be methyl, ethyl, propyl, isopropyl, butyl, isobutyl, tertiary butyl, etc. and in fact any of the alkyl radicals may contain up to 12 carbon atoms. The solvent employed for introducing the alkyl sulfenyl chloride or other halide into the reaction may be any low-boiling paraffinic hydrocarbon, such as n-pentane, light petroleum naphthas, n-hexane, i-heptane, n-heptane, decane, kerosene, mixtures of such hydrocarbons, and the like.

The temperature at which the reaction is effected can be varied over a wide range, the selection of reaction temperature being based on the desired balance of reaction rate and product yield. The reaction proceeds at temperatures as low as about 0° C., and below, and as high as about 180° C., and above. Substantial yields of product at reasonable reaction rates are obtained in the temperature range up to about 180° C. Maximum yields of product are obtained in the temperature range from about 0° C. to about 100° C., and a convenient way to maintain this temperature range is to effect the reaction in the presence of a hydrocarbon solvent under reflux conditions. It will be apparent to those skilled in the art that, while the selection of a proper temperature for conducting the reaction is important, the temperature range employed is not per se the essence of the present invention.

Although the invention is by no means to be construed as limited to the specific examples herein, the following examples, in which the parts are expressed by weight, are illustrative.

EXAMPLE I

A solution of sodium dimethyldithiocarbamate was prepared by adding 76 parts of carbon disulfide to a stirred reaction mixture comprising 45 parts of dimethyl amine and 40 parts of sodium hydroxide in a 20% aqueous solution. The temperature was maintained at about 0° C. during the addition.

The solution was then warmed to 25° C., covered with a layer of pentane and refluxed during the addition of 125 parts of tert-butyl sulfenyl chloride in isopentane. Tert-butylsulfenyl dimethyldithiocarbamate precipitated as formed and was removed by filtration. The total yield was 180 parts (86% of theoretical yield) of the tert-butylsulfenyl dimethyldithiocarbamate, a white crystalline product having a melting point of 69–70° C.

EXAMPLE II

A solution of 125 parts of tert-butyl sulfenyl chloride in n-pentane was added to a stirred, refluxing mixture of 185 parts of sodium pentamethylenedithiocarbamate in water to which a small amount of pentane had been added. The product was separated by filtration to provide 210 parts of pentamethylene-tert-butylsulfenyl dithiocarbamate. Samples were dried in vacuo and analyzed for sulfur with the following results:

|  | Theoretical | Found |
| --- | --- | --- |
| Sample A | 38.55 | 38.04 |
| Sample B | 38.55 | 37.88 |
| Sample C | 38.55 | 37.89 |

EXAMPLE III

Ethylsulfenyl dimethyldithiocarbamate was prepared by addition of a pentane solution of ethylsulfenyl chloride to a suspension of an equimolar amount of crystalline sodium dimethyldithiocarbamate in diethyl ether. A very vigorous reaction ensued, following which the product was separated by crystallization at −80° C. The crystalline ethylsulfenyl dimethyldithiocarbamate melted below 0° C. to form an oil.

EXAMPLE IV

Calcium, magnesium, and barium dimethyldithiocarbamates were prepared from the reaction of dimethylamine and carbon disulfide with the respective metal hydroxides. The dithiocarbamate salts so prepared were then reacted with tertiary-butylsulfenyl chloride according to the method of the invention to provide, in each case, N,N-dimethyl-S-tertiary-butylsulfenyl dithiocarbamate.

In the synthesis of the dithiocarbamate salts, 0.5 mol of dimethylamine in 39 percent aqueous solution was charged to a reactor to which was then added 0.25 mol of the metal hydroxide and 0.5 mol of carbon disulfide. The mixture was stirred for one hour at a temperature of 20 to 25° C. after which 400 ml. of isopentane containing 0.5 mol of tertiary-butylsulfenyl chloride was added with stirring. The N,N-dimethyl-S-tertiary-butylsulfenyl dithiocarbamate was isolated by filtering and washing. Yields of product were, for the calcium salt intermediate, crude 88 percent, recrystallized 72 percent; for the magnesium salt intermediate, crude 85 percent, recrystallized 73 percent; and for the barium salt intermediate, crude 75 percent, recrystallized 68 percent.

The intermediate calcium and barium dithiocarbamates were soluble in the isopentane solution, whereas the magnesium salt was insoluble. The foregoing yields were obtained under widely different conditions of solubility, thereby demonstrating that the selection of the particular metal constituent of the salt is not critical.

EXAMPLE V

Sodium 3-oxapentamethylenedithiocarbamate was prepared by the addition of 76 grams of carbon disulfide to a solution of 40 grams of sodium hydroxide and 87 grams of morpholine in 200 ml. of water and 400 ml. of pentane at a temperature of 0° C. After the formation of the dithiocarbamate salt was complete, the reaction mixture was warmed to room temperature and stirred vigorously during the addition of 1 mol of tertiary-butylsulfenyl chloride in 1600 ml. of pentane.

The 4-oxapentamethylenetertiarybutylsulfenyl dithiocarbamate precipitated from the reaction mixture in the form of white crystals. The crystals were removed on a filter after which the water layer was separated and the pentane evaporated to provide further product. The total yield of crystalline dithiocarbamate was about 62 percent. Melting point of the product was 61° C.

Analysis indicated the following:

| Element | Calculated for $C_9H_{17}NOS_3$ (percent by weight) | Found (percent by weight) |
| --- | --- | --- |
| Sulfur | 38.25 | 36.32 |
| Nitrogen | 5.57 | 5.97 |
| Carbon | 43.03 | 42.93 |
| Hydrogen | 6.77 | 7.19 |

This example is illustrative of the process in which R and R′ form a heterocyclic ring with the nitrogen.

EXAMPLE VI

The following compounds were prepared by the process of the present invention: N,N-di-n-propyltertiarybutylsulfenyl dithiocarbamate, N-ethyltertiarybutylsulfenyl dithiocarbamate, N-isopropyltertiarybutylsulfenyl dithiocarbate, and N,N-di-n-dodecyltertiarybutylsulfenyl dithiocarbamate.

The general method used for the preparation of these compounds comprises reacting the amine with aqueous caustic and carbon disulfide at temperatures of about 0° to 10° C., the carbon disulfide being added to the amine-caustic solution in a dropwise manner. After the reaction was complete, an isopentane solution of tertiarybutylsulfenyl chloride was added to the stirred aqueous dithiocarbamate mixture. The temperature during the addition of the sulfenyl chloride was about 20° C. The reaction mixture was stirred from about 1 to about 6 hours after which it was separated from the aqueous layer, washed with water, filtered, and the filtrate depentanized under reduced pressure to provide the crude product. Data on these runs are tabulated below. In Table I are shown operating data and in Table II the products, yields, and analyses are given.

*Table I*

| Run | | Amine (Mols) | NaOH (Mols) | H₂O (ml.) | Cool to (° C.) | CS₂, Mols | Tert-C₄H₉SCl (mols) | Isopentane (ml.) | Time (Hrs.) |
|---|---|---|---|---|---|---|---|---|---|
| 1 | Di-n-propyl Amine | 1.5 | 1.5 | 60 | 10 | 1.5 | 1.5 | 1,600 | 1.5 |
| 2* | Ethyl Amine | 1.5 | 1.65 | 200 | 10 | 1.5 | 1.5 | 1,600 | 1.5 |
| 3 | Isopropyl Amine | 1.0 | 1.10 | 150 | 0 | 1.0 | 1.0 | 1,050 | 6.0 |
| 4** | Di-n-dodecyl Amine | 1.0 | 1.0 | 50 | 15 | 1.33 | 1.0 | 1,050 ca. | 1.0 |

*204 grams 33%.
**Diarmeen 12 (Armour).

*Table II*

| Run | Sulfenyl Dithiocarbamate Product | Yield (gm.) | Yield (percent) | M. P. (° C.) | Nitrogen | | Sulfur | |
|---|---|---|---|---|---|---|---|---|
| | | | | | Found | Calc. | Found | Calc. |
| 1 | N,N-di-n-propyl tert-butylsulfenyl | 364 | 92 | | | | 35.70 | 36.23 |
| 2 | N-ethyl-tert-butylsulfenyl | 235 | 75 | | 5.86 | 6.70 | 43.3 | 45.9 |
| 3 | N-isopropyl-tert-butylsulfenyl | 192 | 85 | 59–60 | 6.89 | 6.28 | 41.5 | 42.9 |
| 4 | N,N-di-n-dodecyl tert-butylsulfenyl | 487 | 94 | | 3.08 | 2.71 | 17.4 | 18.5 |

The alkyl sulfenyl dithiocarbamate products thus obtained correspond, respectively, to the following formulae:

| Run | Product | Formula |
|---|---|---|
| 1 | N,N-di-n-propyl-tert-butylsulfenyl | $\begin{array}{c}n\text{--}C_3H_7\\ \phantom{xxx}\diagdown\\ n\text{--}C_3H_7\phantom{x}\diagup\end{array}N\text{--}\overset{\overset{\displaystyle S}{\|}}{C}\text{--}S\text{--}S\text{-tert-}C_4H_9$ |
| 2 | N-ethyl-tert-butylsulfenyl | $\begin{array}{c}C_2H_5\\ \phantom{xxx}\diagdown\\ H\phantom{xxx}\diagup\end{array}N\text{--}\overset{\overset{\displaystyle S}{\|}}{C}\text{--}S\text{--}S\text{-tert-}C_4H_9$ |
| 3 | N-isopropyl-tert-butylsulfenyl | $\begin{array}{c}\text{iso--}C_3H_7\\ \phantom{xxx}\diagdown\\ H\phantom{xxx}\diagup\end{array}N\text{--}\overset{\overset{\displaystyle S}{\|}}{C}\text{--}S\text{--}S\text{-tert-}C_4H_9$ |
| 4 | N,N-di-n-dodecyl-tert-butylsulfenyl | $\begin{array}{c}n\text{--}C_{12}H_{25}\\ \phantom{xxx}\diagdown\\ n\text{--}C_{12}H_{25}\phantom{x}\diagup\end{array}N\text{--}\overset{\overset{\displaystyle S}{\|}}{C}\text{--}S\text{--}S\text{-tert-}C_4H_9$ |

A variation in the process was introduced in Run 4. One mol of carbondisulfide was added dropwise, the mixture was stirred for twenty minutes, and the remainder of the carbon disulfide was added. The mixture was then stirred for two hours.

EXAMPLE VII

A series of runs was made to demonstrate the effectiveness of the process of the invention over a wide range of temperatures. The reaction of tert-butylsulfenyl chloride with sodium dimethyldithiocarbamate to form N,N-dimethyl-tert-butylsulfenyl dithiocarbamate was carried out at temperatures of 27 to 50° C., 85 to 86° C., and 150 to 160° C. In the case of the first two temperature ranges recited, aqueous 40 percent sodium dimethyldithiocarbamate was added to a solution of tert-butylsulfenyl chloride in kerosene using a one-liter, glass flask as a reaction vessel. In the case of the last temperature range recited, the reaction was carried out in a 1400 ml. stainless steel bomb equipped with a thermowell, a pressure gauge and an inlet for admitting the tert-butylsulfenyl chloride solution.

Aqueous 40 percent sodium dimethyldithiocarbamate was charged to the bomb and the bomb flushed with nitrogen. After closing, the bomb was placed on a platform rocker and heated, with shaking, to the reaction temperature. A n-heptane solution of tert-butylsulfenyl chloride, which had been previously prepared by chlorinating di-tert-butyl disulfide at room temperature, was formed into the reaction bomb from a second stainless steel bomb. This second bomb was equipped with openings at both ends and sufficient nitrogen pressure was maintained over the sulfenyl chloride solution to force the solution into the reaction bomb. After the sulfenyl chloride solution had been forced into the reaction bomb, the two solutions were shaken together for 5 minutes to complete the reaction. The bomb was removed from the rocker and the reaction mixture cooled to about 175° F. by immersing the bomb in water. The bomb was opened and the reaction mixture filtered to remove the carbonaceous material formed in the reaction. The phases were separated, the water phase discarded, and the oil phase washed with water. The product was recovered from the oil phase by crystallization. The crystals were washed with n-heptane and dried in a vacuum oven. The results of these runs are summarized below in Table III.

*Table III*

| Run No. | Reaction Temperature, °C. | Product Yield [1] (mole percent) of theoretical | Melting Point of product (°C., uncorrected) |
|---|---|---|---|
| 1 | 27 to 50 | 75.5 | 71.2 to 72 |
| 2 | 85 to 86 | 75.6 | 72 to 72.5 |
| 3 | 150 to 160 | 29.5 | 71 to 72.2 |

[1] Based on sodium dimethyldithiocarbamate.

While our invention has been described in connection with present preferred embodiments thereof, it is to be understood that this description is illustrative only and is not intended to limit the invention.

We claim:

1. A process of reacting an alkyl sulfenyl halide in which the alkyl group contains from 1 to 12 carbon atoms and the halide is selected from the group consisting of chlorides, bromides and iodides with an aqueous solution of a compound corresponding to the formula

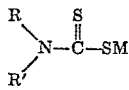

wherein

is a substituted amino group in which not more than one hydrogen is attached to the nitrogen atom, R and R' are selected from the group consisting of hydrogen, hydrocarbon radicals selected from the group consisting of alkyl, cycloalkyl, aryl, aralkyl radicals and radicals which in combination with nitrogen constitute saturated carbon-nitrogen, carbon-nitrogen-oxygen and carbon-nitrogen-sulfur rings having not less than five and not more than six members of which at least four members are carbon atoms, and wherein M is a salt-forming cation, at a reaction temperature to produce alkyl sulfenyl dithiocarbamates.

2. A process of reacting an alkyl sulfenyl halide in which the alkyl group contains from 1 to 12 carbon atoms and the halide is selected from the group consisting of chlorides, bromides and iodides with an aqueous solution of a compound corresponding to the formula

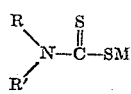

wherein

is a substituted amino group in which not more than one hydrogen is attached to the nitrogen atom, R and R' are selected from the group consisting of hydrogen, hydrocarbon radicals selected from the group consisting of alkyl, cycloalkyl, aryl, and aralkyl radicals and radicals which in combination with nitrogen constitute saturated carbon-nitrogen, carbon-nitrogen-oxygen and carbon-nitrogen-sulfur rings having not less than five and not more than six members of which at least four members are carbon atoms, and wherein M is a salt-forming cation, at a reaction temperature up to about 180° C. to produce alkyl sulfenyl dithiocarbamates.

3. The process of preparing alkyl sulfenyl dithiocarbamates which comprises reacting, at a temperature between about 0° C. and about 100° C., an alkyl sulfenyl halide in which the alkyl group contains from 1 to 12 carbon atoms and the halide is selected from the group consisting of chlorides, bromides and iodides with an aqueous solution of a compound corresponding to the formula

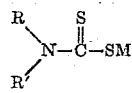

wherein

is a substituted amino group in which not more than one hydrogen is attached to the nitrogen atom, R and R' are selected from the group consisting of hydrogen, hydrocarbon radicals selected from the group consisting of alkyl, cycloalkyl, aryl, and aralkyl radicals and radicals which, in combination with nitrogen, constitute saturated carbon-nitrogen, carbon-nitrogen-oxygen and carbon-nitrogen-sulfur rings having not less than five and not more than six members of which at least four members are carbon atoms, and wherein M is a salt-forming cation.

4. The process of claim 3 in which M is an alkali metal.

5. The process of claim 3 in which M is sodium.

6. The process of claim 3 in which M is potassium.

7. The process of claim 3 in which M is an alkaline earth metal.

8. The process of claim 3 in which the reaction proceeds in the presence of a hydrocarbon solvent.

9. The process of claim 3 in which the alkyl sulfenyl halide is an alkyl sulfenyl chloride.

10. The process of claim 3 in which the alkyl sulfenyl halide is tert-butylsulfenyl chloride.

11. The process of claim 3 in which the alkyl sulfenyl halide is ethylsulfenyl chloride.

12. The process of preparing alkyl sulfenyl dithiocarbamates which comprises reacting at a temperature between about 0° C. and about 100° C. a lower alkyl sulfenyl halide selected from the group consisting of chlorides, bromides and iodides with an aqueous solution of sodium dimethyldithiocarbamate.

13. The process of preparing alkyl sulfenyl dithiocarbamates which comprises reacting at a temperature between about 0° C. and about 100° C. a lower alkyl sulfenyl halide selected from the group consisting of chlorides, bromides and iodides with an aqueous solution of sodium pentamethylenedithiocarbamate.

14. The process of preparing tert-butylsulfenyl dimethyldithiocarbamate which comprises reacting at a temperature between about 0° C. and about 100° C. tert-butylsulfenyl chloride dissolved in n-pentane with an aqueous solution of sodium dimethyldithiocarbamate.

15. The process of preparing tert-butylsulfenyl dimethyldithiocarbamate which comprises reacting at a temperature between about 0° C. and about 100° C. tert-butylsulfenyl chloride with an aqueous solution of sodium dimethyldithiocarbamate.

16. The process of preparing alkyl sulfenyl dithiocarbamates which comprises reacting at a temperature between about 0° C. and about 100° C. a lower alkyl sulfenyl halide in which the alkyl group contains from 1 to 12 carbon atoms and the halide is selected from the group consisting of chlorides, bromides and iodides with an aqueous solution of sodium 3-oxapentamethylenedithiocarbamate.

17. The process of preparing alkyl sulfenyl dithiocarbamates which comprises reacting at a temperature between about 0° C. and about 100° C. a lower alkyl sulfenyl halide selected from the group consisting of chlorides, bromides and iodides with an aqueous solution of sodium ethyldithiocarbamate.

18. The process of preparing alkyl sulfenyl dithiocarbamates which comprises reacting at a temperature between about 0° C. and about 100° C. a lower alkyl sulfenyl halide selected from the group consisting of chlorides, bromides and iodides with an aqueous solution of sodium di-n-dodecyldithiocarbamate.

19. The process of preparing alkyl sulfenyl dithiocarbamates which comprises reacting at a temperature between about 0° C. and about 100° C. a lower alkyl sulfenyl halide selected from the group consisting of chlorides, bromides and iodides with an aqueous solution of sodium alkyl dithiocarbamate.

References Cited in the file of this patent

UNITED STATES PATENTS

| | | |
|---|---|---|
| 1,809,457 | Teppema | June 9, 1931 |
| 2,396,789 | Hunt | Mar. 19, 1946 |
| 2,599,350 | Rudel | June 3, 1952 |

OTHER REFERENCES

Simons: Industrial and Engineering Chem., vol. 39, p. 238 (1947).